US008138962B2

(12) United States Patent  (10) Patent No.: US 8,138,962 B2
Bon et al.                  (45) Date of Patent: Mar. 20, 2012

(54) METHOD FOR PROCESSING MEASURED VERTICAL PROFILES OF THE POWER OF THE ECHOES RETURNED FOLLOWING A TRANSMISSION OF RADAR SIGNALS

(75) Inventors: Nicolas Bon, Brest (FR); Jean-Paul Artis, Plouzane (FR); Alain Becker, Montrouge (FR); Maxence Marcant, Milizac (FR)

(73) Assignee: Thales (FR)

( * ) Notice: Subject to any disclaimer, the term of this patent is extended or adjusted under 35 U.S.C. 154(b) by 194 days.

(21) Appl. No.: 12/611,566

(22) Filed: Nov. 3, 2009

(65) Prior Publication Data
    US 2010/0109942 A1    May 6, 2010

(30) Foreign Application Priority Data
    Nov. 4, 2008 (FR) ..................... 08 06140

(51) Int. Cl.
    *G01S 13/00* (2006.01)
(52) U.S. Cl. ............. 342/26 B; 342/26 R; 342/159
(58) Field of Classification Search ............. 342/26 R, 342/26 A, 26 B, 26 C, 26 D, 147, 158, 159
    See application file for complete search history.

(56) References Cited

U.S. PATENT DOCUMENTS

| 4,139,847 | A | * | 2/1979 | Shimzu et al. | 342/26 D |
| 4,318,100 | A | * | 3/1982 | Shimizu et al. | 342/26 D |
| 4,459,592 | A | * | 7/1984 | Long | 342/93 |
| 4,628,318 | A | * | 12/1986 | Alitz | 342/26 D |
| 4,684,950 | A | * | 8/1987 | Long | 342/94 |
| 4,709,236 | A | * | 11/1987 | Taylor, Jr. | 342/101 |
| 4,739,327 | A | * | 4/1988 | Konig et al. | 342/26 B |
| 4,928,131 | A | * | 5/1990 | Onozawa | 342/188 |
| 5,311,188 | A | * | 5/1994 | Meijer et al. | 342/90 |
| 5,451,961 | A | * | 9/1995 | Rubin et al. | 342/159 |
| 5,485,157 | A | * | 1/1996 | Long | 342/160 |
| 5,686,919 | A | * | 11/1997 | Jordan et al. | 342/26 D |
| 6,157,891 | A | * | 12/2000 | Lin | 701/301 |
| 6,307,501 | B1 | * | 10/2001 | Wills et al. | 342/161 |
| 6,424,288 | B1 | * | 7/2002 | Woodell | 342/26 R |
| 6,603,425 | B1 | * | 8/2003 | Woodell | 342/26 R |
| 6,667,710 | B2 | * | 12/2003 | Cornell et al. | 342/26 R |
| 6,690,317 | B2 | * | 2/2004 | Szeto et al. | 342/26 R |
| 6,771,207 | B1 | * | 8/2004 | Lang | 342/26 R |

(Continued)

FOREIGN PATENT DOCUMENTS

DE    10 2005 023 787 A1    11/2006

(Continued)

*Primary Examiner* — Thomas Tarcza
*Assistant Examiner* — Peter Bythrow
(74) *Attorney, Agent, or Firm* — Baker & Hostetler, LLP

(57) ABSTRACT

The method processes measured vertical profiles of the power of the echoes returned following a transmission of radar signals, each measured vertical profile being a function of the sweep angle of the radar beam and associated with a given pointing angle/distance box pair of the radar beam. The method generates a synthetic vertical profile of the power of the echoes returned by the ground only, and includes, for each measured vertical profile: superposition of the synthetic vertical profile on the measured vertical profile in question, for various values of the sweep angle, calculation of the error that exists between the measured vertical profile and the synthetic vertical profile, for each sweep angle value in question, and an exclusion, from the measured vertical profile, of the values for which the calculated error is less than a given threshold, in order to generate a resultant vertical profile with no ground echoes.

15 Claims, 7 Drawing Sheets

U.S. PATENT DOCUMENTS

| | | | |
|---|---|---|---|
| 7,095,358 B2 * | 8/2006 | Krikorian et al. | 342/25 B |
| 7,205,928 B1 * | 4/2007 | Sweet | 342/26 B |
| 7,808,422 B1 * | 10/2010 | Woodell et al. | 342/26 B |
| 7,880,664 B2 * | 2/2011 | Hannesen et al. | 342/26 D |
| 8,077,081 B2 * | 12/2011 | Bateman et al. | 342/195 |
| 2009/0066563 A1 * | 3/2009 | Hannesen et al. | 342/26 D |

FOREIGN PATENT DOCUMENTS

| | | |
|---|---|---|
| JP | 2005-326228 A | 11/2005 |

* cited by examiner

METHOD FOR PROCESSING MEASURED VERTICAL PROFILES OF THE POWER OF THE ECHOES RETURNED FOLLOWING A TRANSMISSION OF RADAR SIGNALS

CROSS-REFERENCE TO RELATED APPLICATIONS

This application claims priority of French application no. FR 08/06140, filed Nov. 4, 2008, the disclosure of which is hereby incorporated by reference in its entirety.

BACKGROUND OF THE INVENTION

The invention belongs to the field of radar signal processing in particular for airborne weather radars.

An airborne radar comprises a transmitter which sends signals, more precisely radio waves. The latter are reflected by the target and detected by a receiver, also incorporated within the radar. The position of the targets that are in the field of the transmitted radio waves is estimated by virtue of the time they take to return. In the context of a weather application, a target may be a cloud, for example. In other words, by interpreting the waves returned by the targets, their position is deduced therefrom.

The echoes returned by the ground called "ground echoes" may be particularly obstructive for the interpretation of the received signals.

Specifically, the latter may be interpreted as signals back-scattered by clouds. All the more so because, depending on the type of terrain observed, the power reflected by the ground is usually as great or even greater than that reflected by the weather phenomena, which results in the appearance of a high reflectivity value on the radar image.

The appearance of this high reflectivity value on a radar image will reflect a dangerous phenomenon and be indicated as such to the pilot, thereby creating a false alarm.

It is therefore particularly important to dispense with the ground echoes so as not to perturb the pilot.

From the prior art (U.S. Pat. No. 6,603,425, Collins) a method is known for detecting ground echoes with the aid of two horizontal sweeps, on two distinct elevation values. The latter are subtracted from one another and the resultant difference is compared with a reference value in order to determine the power due to the ground echoes.

However, this method is not very precise (because of a small number of elevation values in question), and not very robust when certain weather phenomena arise. Moreover, many accuracy problems may occur because of the time necessary to make each horizontal sweep.

SUMMARY OF THE INVENTION

The invention notably solves the afore-mentioned problem(s).

Accordingly, according to a first aspect, a method is proposed for processing measured vertical profiles of the power of the echoes returned following a transmission of radar signals, each measured vertical profile being a function of the sweep angle of the radar beam and associated with a given pointing angle/distance box pair of the radar beam.

According to a general feature of the invention, the method comprises a generation of a synthetic vertical profile of the power of the echoes returned by the ground only, and for each measured vertical profile:

a superposition of the synthetic vertical profile on the measured vertical profile in question, for various values of the sweep angle, a calculation of the error that exists between the measured vertical profile and the synthetic vertical profile, for each sweep angle value in question, and an exclusion, from the measured vertical profile, of the values for which the calculated error is less than a given threshold, called values to be excluded, in order to generate a resultant vertical profile with no ground echoes.

In other words, a zone corresponding to a synthetic vertical profile of the ground echoes only is excluded from each measured vertical profile. The method according to the invention is not therefore based on the comparison of data, but on the estimation of a model which is the synthetic vertical profile, based on observed data. The advantage of this is that it makes the method much more precise and robust, unlike the solutions of the prior art.

Preferably, the sweep angle is the angle of elevation and the pointing angle is the relative bearing.

Specifically, the use of data obtained by vertical sweeps is more reliable, because the time necessary to obtain a vertical profile is much shorter than the time necessary to obtain a vertical difference of two layers, that is found notably in the aforementioned document U.S. Pat. No. 6,603,425, Collins. Notably this makes it possible to prevent problems of deformation or adjustment of data due to the movement of the aircraft.

Preferably, the said comparison is made only for certain points of the measured vertical profile, corresponding to sweep angle values of less than a given threshold.

For example, the said comparison may be made for all of the points of the measured vertical profile, if the number of points of the measured vertical profile is less than a given threshold.

The method may also comprise a calculation of the height of the ground for the measured vertical profile in question, which comprises:

another superposition of the synthetic vertical profile on the measured vertical profile in question, for all of the sweep angle values, a calculation of the error that exists between the measured vertical profile and the synthetic vertical profile, for all of the sweep angle values, a determination of the sweep angle value of the baric centre of the measured vertical profile corresponding to the minimal calculated error, a calculation of a so-called ground height for the measured vertical profile in question, with the aid of the said determined sweep angle value, the values of the vertical profile that are less than the pointing value corresponding to the calculated ground height then being also excluded.

Preferably, the said values to be excluded and the values of the ground height calculated for a given measured vertical profile are smoothed before the exclusion.

It is particularly advantageous that each resultant vertical profile is filtered so as to eliminate the isolated values.

The exclusion may also be a function of a numerical model of the ground.

According to another aspect of the invention, a device for processing radar signals is proposed, coupled to a radar antenna capable of measuring the vertical profiles of the power of the echoes returned following a transmission of radar signals, each measured vertical profile being a function of the sweep angle of the radar beam and associated with a given pointing angle/distance box pair of the radar beam.

According to a general feature of this other aspect, the device comprises a means for generating a synthetic vertical profile of the power of the echoes returned by the ground only, a first processing means capable, for each measured vertical profile, of:

superposing the synthetic vertical profile on the measured vertical profile in question, for various values of the sweep angle, calculating the error that exists between the measured vertical profile and the synthetic vertical profile, for each sweep angle value in question, and an exclusion means capable of excluding, from the measured profile, values for which the calculated error is less than a given threshold, called the values to be excluded, so as to generate a resultant vertical profile with no ground echoes.

According to one embodiment, the device may also comprise a second processing means capable of calculating the height of the ground for the measured vertical profile in question, the said exclusion means also being capable of excluding the values of the vertical profile that are below the sweep value corresponding to the calculated ground height.

According to another aspect of the invention, a radar receiver is proposed incorporating a device as described above.

BRIEF DESCRIPTION OF THE DRAWINGS

Other advantages and features of the invention will appear on examination of the detailed description of an application of a method according to the invention and of an embodiment of a device according to the invention, these being in no way limiting, and of the appended drawings in which.

DETAILED DESCRIPTION

Figure 1:
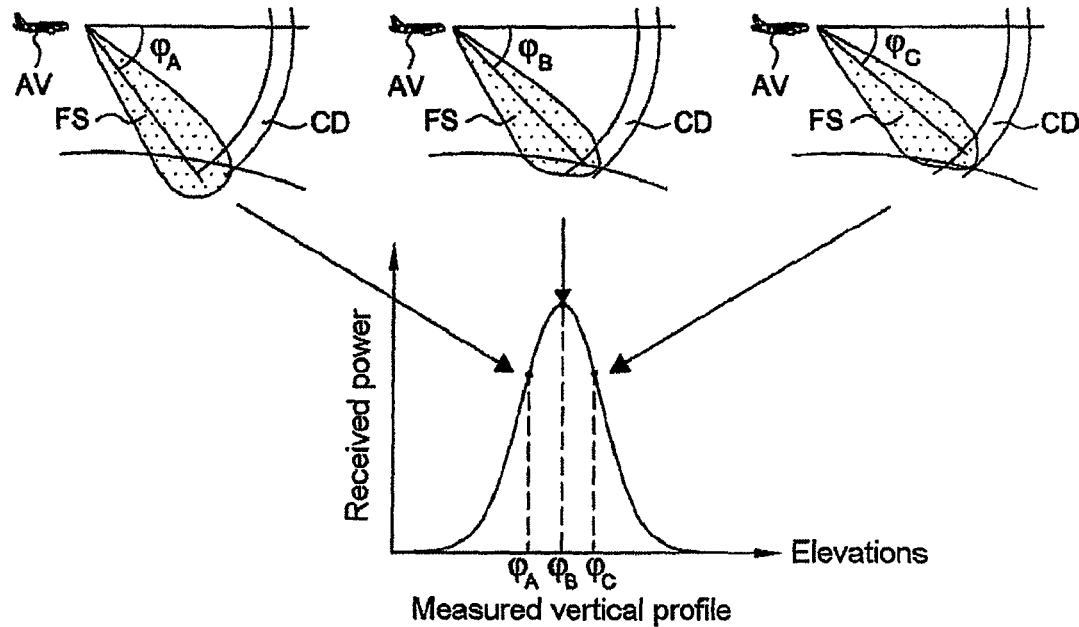
FIG. 1 illustrates an example of movement of a radar beam, and a vertical profile measured during this movement in the absence of weather phenomena.

Reference is made to FIG. 1. The reference AV is an airborne carrier, in this example an aircraft. The latter is furnished with a radar transmitting a radar beam FS. In each of the three diagrams, respectively A, B and C, the angle of elevation of the radar beam, respectively $\phi_A$, $\phi_B$ and $\phi_C$, varies. Note that the angle of elevation (or angle of site) is the angle formed between the horizon and the radar beam FS (in a horizontal plane).

The space aimed at by the radar beam is divided into distance boxes. One of these distance boxes referenced CD is illustrated on each of the diagrams A, B and C. A distance box CD is a three-dimensional elementary analysis cell. The response from the environment to the transmission of the radar signal is studied for each distance box CD. The number of distance boxes increases or diminishes as a function of the resolution of the radar used.

Consequently, for a fixed relative bearing (note that the relative bearing is the angle formed between the axis of the aircraft and the beam, in the horizontal plane), the vertical profile of the response from the distance box CD represented in each of the diagrams A, B, C is produced. This vertical profile is a function of the sweep angle of the radar beam FS, in this instance the angle of elevation.

More precisely, the vertical profile represented illustrates the power received by the radar antenna of the aircraft, for a given distance box CD, as a function of the angle of elevation.

In the absence of any weather phenomenon, the measured vertical profile has the shape of the diagram of the radar antenna. The received power is then mainly due to the echoes returned by the ground, called ground echoes.

Figures 2A, 2B:
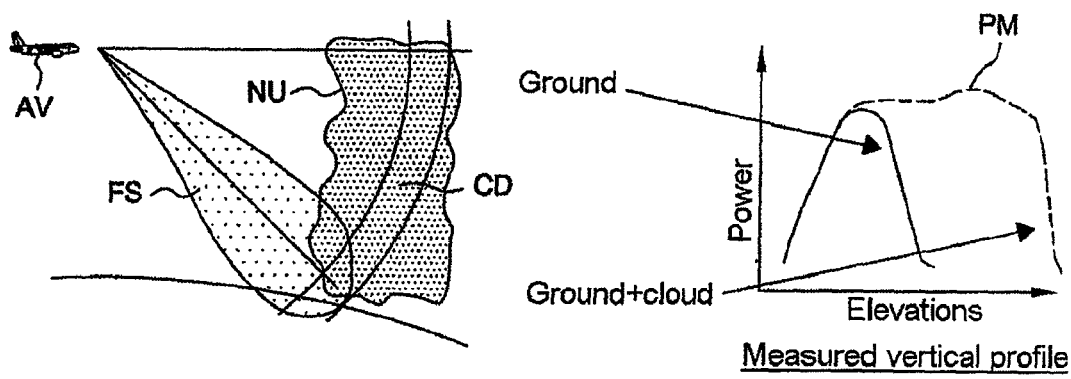
FIG. 2a illustrates another example of movement of a radar beam.
FIG. 2b illustrates a vertical profile measured during the movement represented in FIG. 2a, in the presence of weather phenomena.

FIG. 2a illustrates the case in which the radar beam FS of the aircraft AV encounters a cloud NU. In this case, the measured vertical profile PM (in this instance for the distance box CD), has a shape like that represented in the dotted curve of FIG. 2b. The portion represented in solid line represents the received power due to the ground echoes.

Preferably, each vertical profile is formed with the aid of at least two or even three distinct values of the angle of elevation.

One object of the invention is to detect within a measured vertical profile the portion of the received power due to the ground echoes, which is particularly tricky when the aircraft AV is in the presence of weather phenomena.

Figure 3:
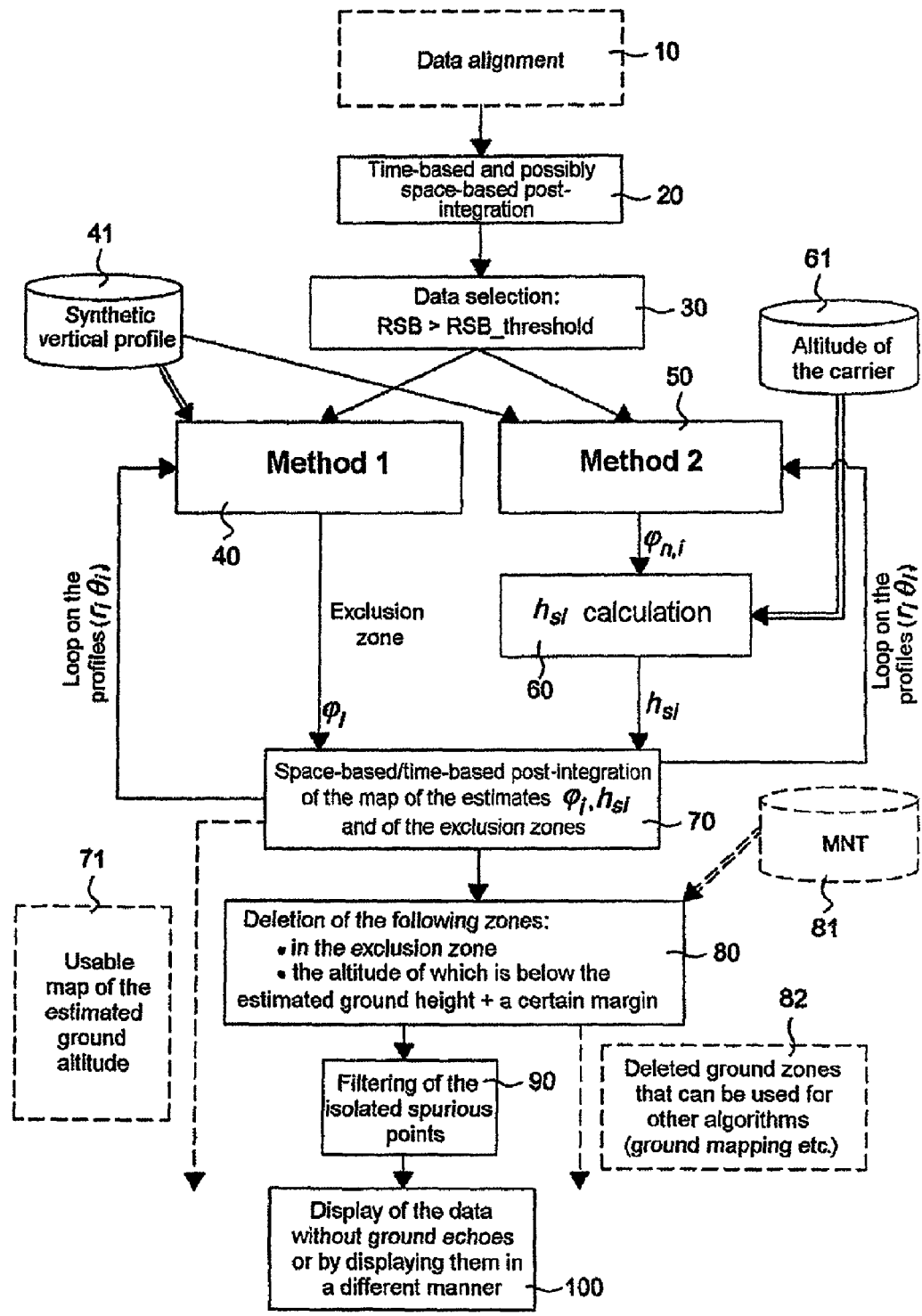
FIG. 3 illustrates the various steps applied of a method according to the invention.

Reference is now made to FIG. 3 which illustrates an application of a method according to the invention.

Once the data have been received by the radar antenna and sampled, the method may comprise a first step 10 (optional) for pre-processing the data corresponding to the measured vertical profiles. Note that the sampling may be an oversampling in order to overcome a possible weakness of angular resolution of the measured vertical profiles.

The latter may consist in compensating for the distance migrations when necessary. In other words, for each measurement, the fact that the aircraft is moving during the receipt of the data is compensated for. This pre-processing step 10 may also comprise an alignment of the data so that each measured vertical profile corresponds to the same geographic zone of the ground.

This pre-processing step may be unnecessary if a radar antenna of the vertical electronic sweep type is used. The latter makes it possible to obtain a vertical section much more quickly than a mechanical sweep radar antenna and thus to limit the effects of distance migration.

A second step 20 comprises a time-based and possibly space-based weighting, in order to carry out a smoothing of the measured data. The object of this step is to make the following processing more robust, thanks to the elimination of possible spurious echoes. Possible false alarms are thus avoided.

A third step 30 comprises a rapid selection of the measurements taken as a function of their signal-to-thermal noise ratio commonly called RSB. If this ratio is above a threshold called RSB_threshold, the measurement can be used and therefore retained for the rest of the processing. Conversely, measurements considered not very reliable (immersed in thermal noise) are discarded from the rest of the processing. The threshold RSB_threshold is determined analytically as a function of the desired probability of false alarm and of the number of samples originating from the second step. Moreover, it may (like the other thresholds mentioned in this patent application) be adapted to suit the contextual variables (geographic zone, season, altitude of the aircraft, etc.).

A fourth step 40 comprises the application of a first method one objective of which is to detect within each measured vertical profile the portion of the received power due to the ground echoes. More precisely, the first method is applied for each distance box/relative bearing pair.

Figure 4:
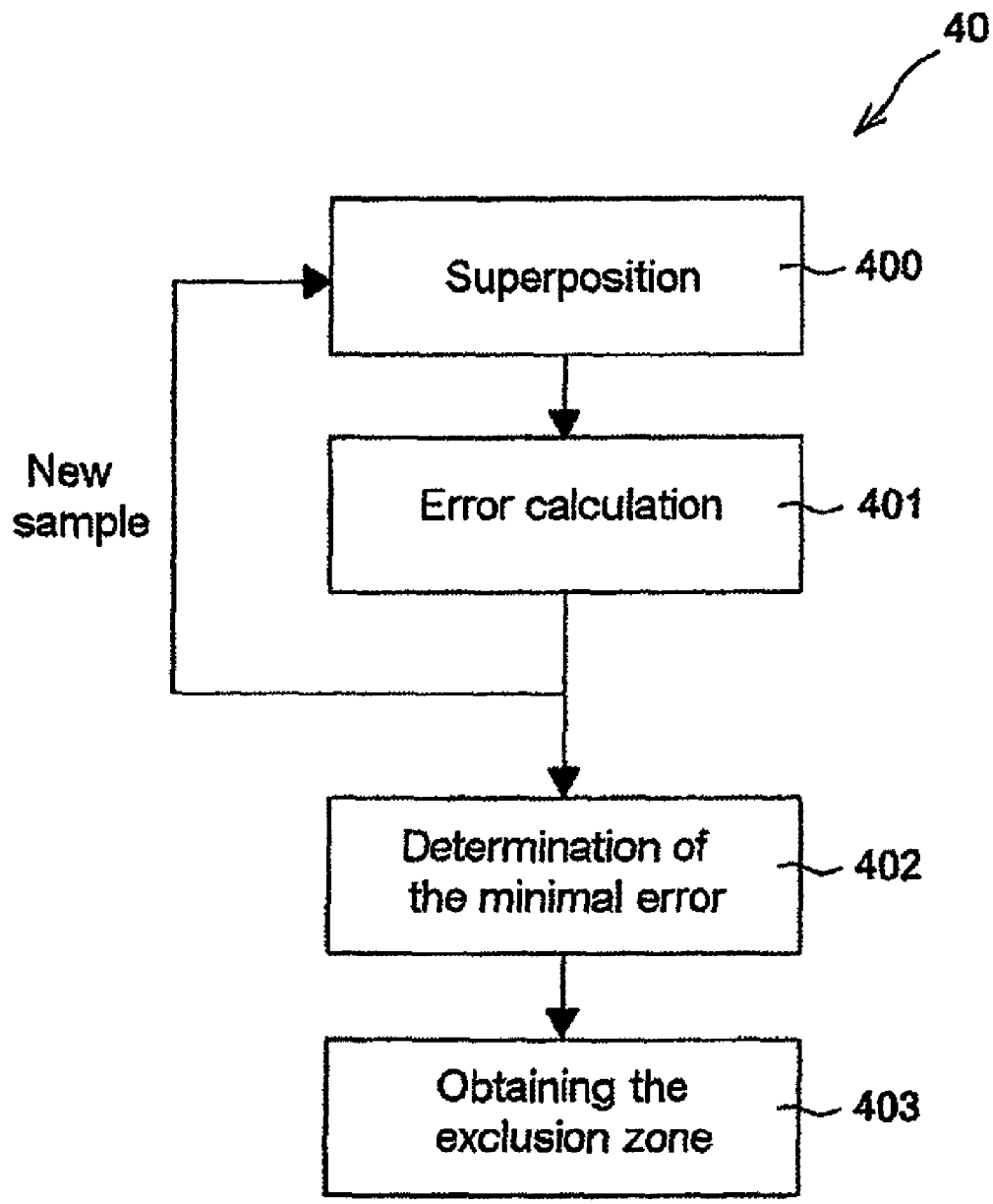
FIGS. 4, 5, 6 and 7 illustrate more precisely the steps of the application represented in FIG. 3, FIG. 8 gives details of the various parameters used by several steps of the application represented in FIG. 7.

This step 40 is shown in detail in FIG. 4. It uses a stored synthetic vertical profile of the ground echoes, reference number 41 in FIG. 3. The latter corresponds to the power of the echoes reflected only by the ground, following the transmission of a radar signal.

This synthetic vertical profile is generated when the radar antenna is designed. It corresponds to the shape of the antenna diagram of the radar antenna and/or is based on observed data. Preferably, the synthetic vertical profile is standardized so that only its shape is considered in the rest of the processing. Once generated, the synthetic vertical profile is stored permanently.

During a first step 401 of the application of the aforementioned first method, the stored synthetic profile is superposed on the processed measured vertical profile, that is to say for a given distance box/relative bearing pair. Each distance box of rank i, $CD_i$, is referenced by the magnitude $r_i$ corresponding to the distance between the cell and the radar antenna. The relative bearing of rank i is referenced $\theta_i$.

Figure 5:
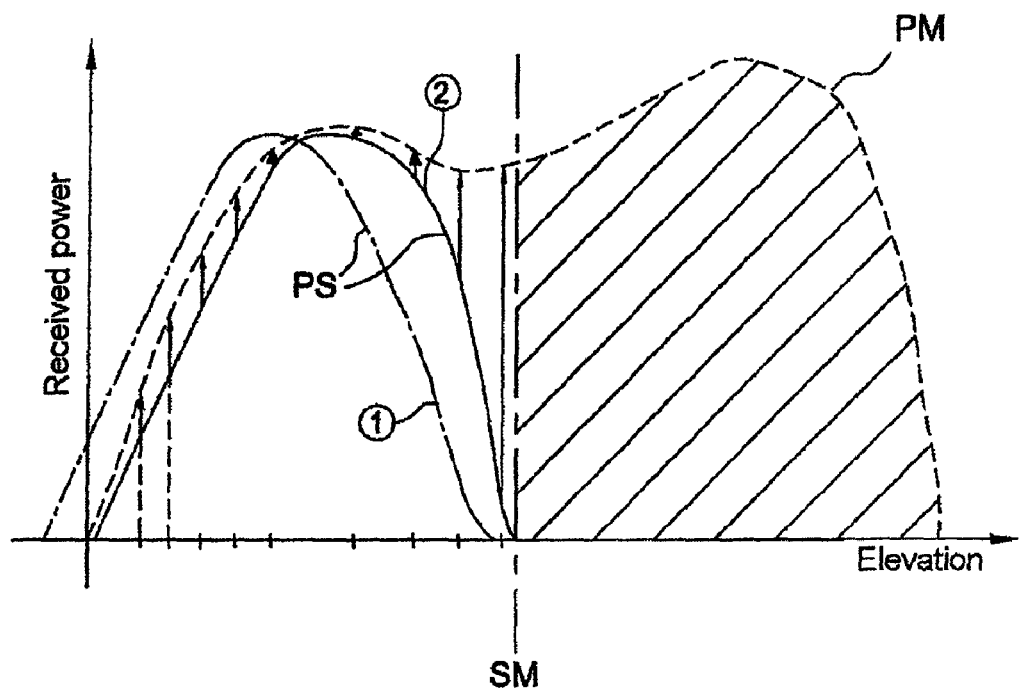

This superposition 401 is illustrated more precisely in FIG. 5. The latter represents a measured profile PM (in dashed line) during processing. The crosses situated on the elevation axis correspond to the various samples.

In this figure, the first method is applied only to the first portion of the measured profile, for example for the first N samples (N being an integer). Specifically, since the ground echoes correspond to the lowest elevations, it is preferable to restrict oneself to the bottom portion of the profile. Consequently, the samples situated to the right of the threshold SM (the hashed portion) are not processed.

The stored synthetic vertical profile PS is then superposed on the bottom portion of the profile. In this example, two possible positions of the synthetic profile relative to the measured profile PM are shown (curve 1 and curve 2).

Note that, if an insufficient number of measurements is available, it is possible to apply the first method to the whole of the measured profile.

Reference is now made to FIG. 4.

Once the two profiles have been superposed, the error existing between them is calculated, step 401. This error is symbolized by the vertical arrows in FIG. 5 (curve 2). Preferably, the error is calculated in decibels so that each elevation value has the same weight.

These steps 401 and 402 are repeated for each possible position of the synthetic profile PS relative to the measured profile PM.

Once the errors have been calculated, a determination is made as to which is the minimal error 402. In FIG. 4, the error is minimal when the synthetic vertical profile is in the position of the curve 2.

In other words:

$$\hat{\varphi}_0 = \arg\min_{\varphi_0}\{e(\varphi_0)\} = \arg\min_{\varphi_0}\left\{\frac{1}{N}\sum_{j=1}^{N}|P_{measured}(j) - P_{synthetic}(j, \varphi_0)|\right\}$$

where:
$\hat{\varphi}_0$ is the value of the elevation for which the error is minimal;
e is the error calculated for the value $\varphi_0$ of elevation,
N is the number of samples in question,
j is the rank of the sample processed,
$P_{measured}(j)$ is the power of the measured vertical profile processed for the sample of rank j, and
$P_{synthetic}(j)$ is the power of the synthetic vertical profile for the sample of rank j.

When the synthetic vertical profile is in this position, it means that the corresponding portion of the measured vertical profile corresponds to the ground echoes. Therefore, in order to obtain a measured vertical profile with no ground echoes, it is sufficient to exclude the corresponding zone ("values to be excluded"). However, in the example below, the exclusion is carried out later for the purpose of optimization.

In a step 403, it is sufficient to store a zone corresponding to the position of the synthetic profile having a minimal error, called the exclusion zone (or "values to be excluded"). Preferably, each exclusion zone is stored with a certain margin.

Reference is now made to FIG. 3.

In parallel with the application of the method 1, in order to improve the definition of the resultant vertical profile, a second method is applied to the measured vertical profile.

Figure 6:
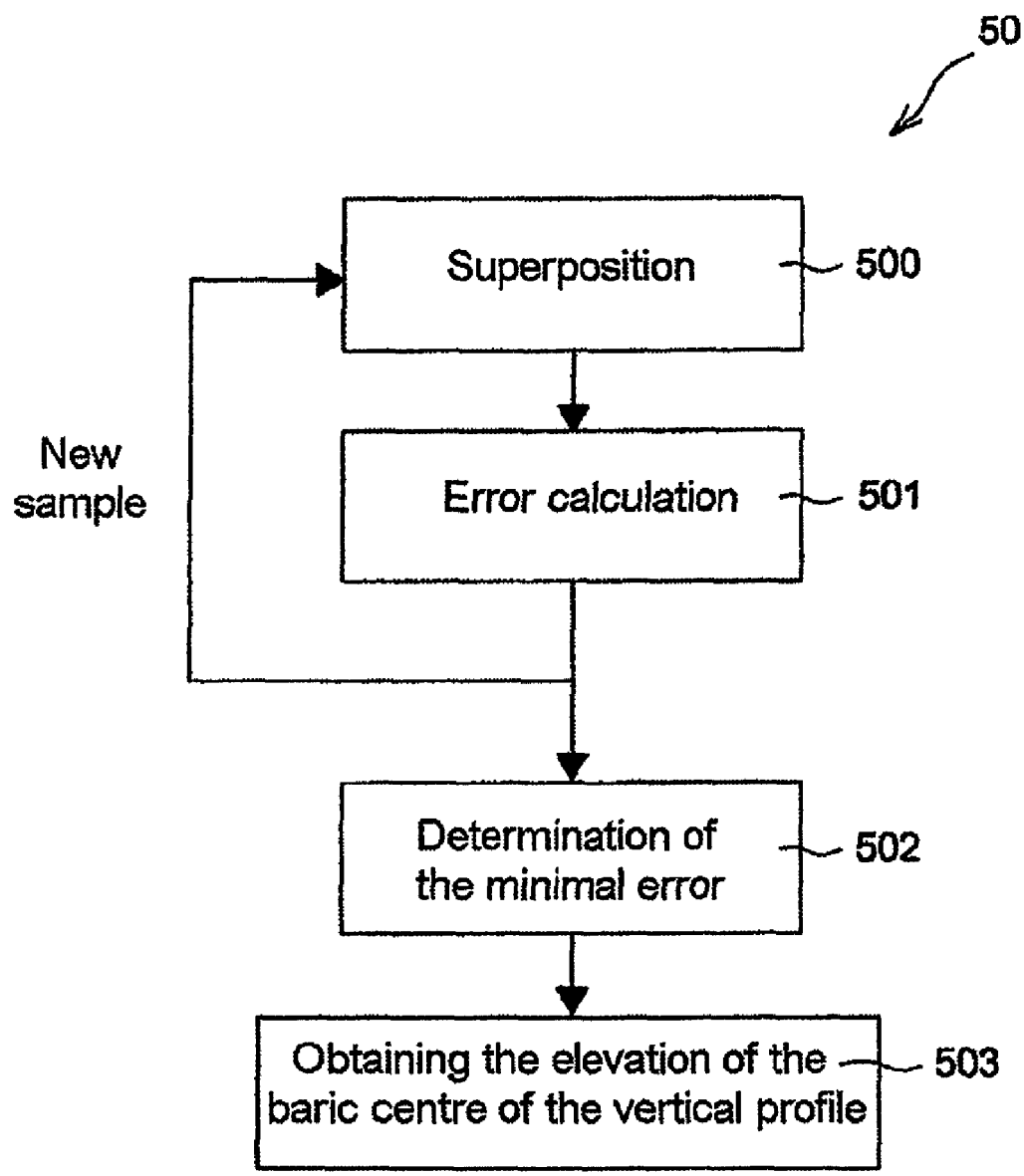

As for the method 1, as illustrated in FIG. 6, the synthetic vertical profile is superposed onto the measured vertical profile for each sample value, step 500. However, unlike the first method, all of the samples of the profile are considered for this second method.

For each position of the synthetic vertical profile relative to the measured vertical profile, the error between the two profiles is calculated, 501.

Once this error has been calculated for all of the samples, the minimal error is determined, 502.

Figure 7:
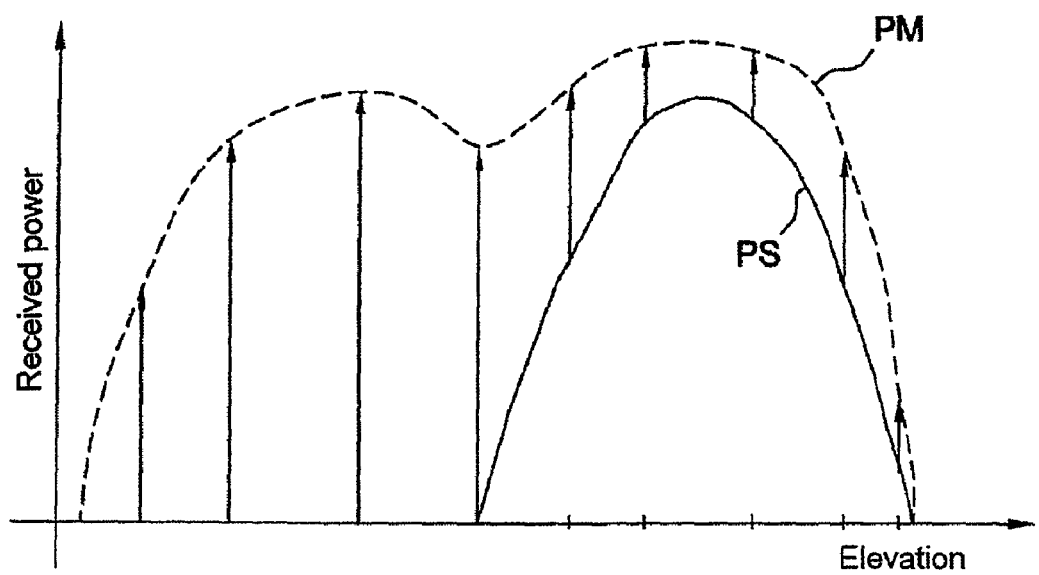

As shown in FIG. 7, the error between the measured profile PM and the synthetic profile PS is minimal when the synthetic profile PS is situated at the baric centre of the measured profile PM. This baric centre of the power of the measured profile corresponds to a maximum reflectivity in the environment of the aircraft.

In other words, it bears witness to the presence of a cloud, referenced by its centre. Consequently, the value of the elevation associated with the minimal error corresponds to the centre of a cloud, 503. The latter, referenced $\phi_{n,i}$ for a distance box/relative bearing pair $(r_i, \theta_i)$, is delivered at the output of the second method.

The height called the ground height corresponding to the elevation of the baric centre of the profile is then calculated during a step 60. This height corresponds to the height corrected by the effect of the curvature of the Earth.

Figure 8:
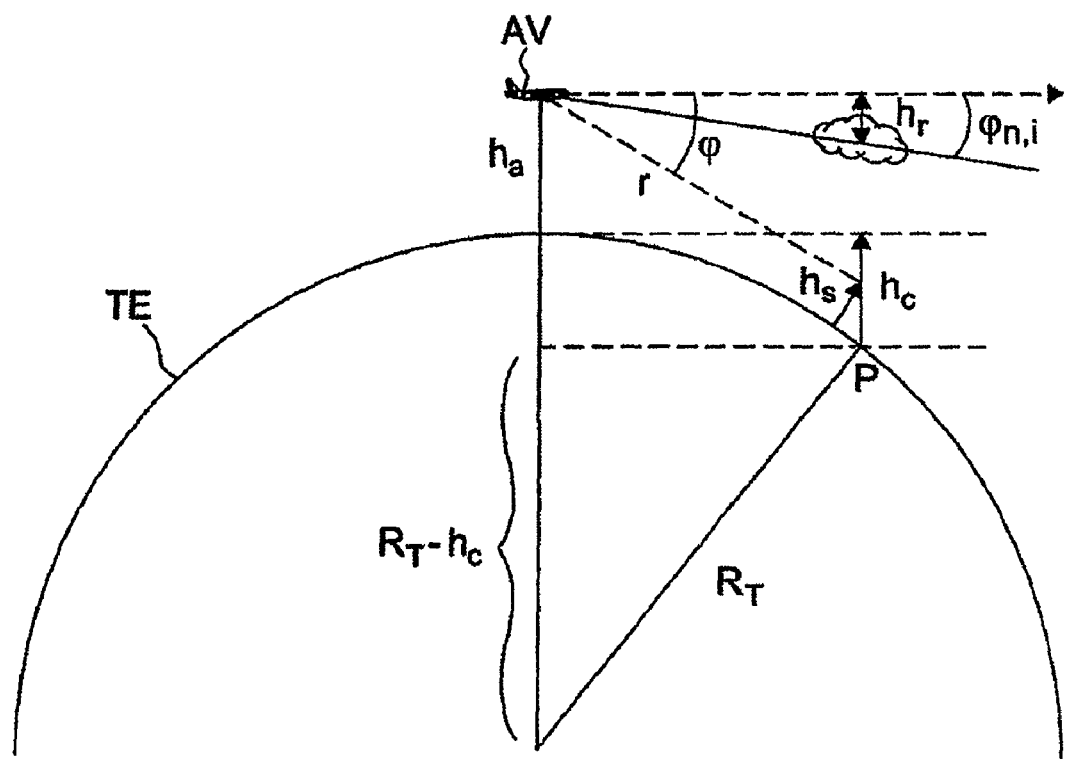

The various magnitudes applied in this calculation are shown in FIG. 8.

A semicircle TE roughly symbolizes the planet Earth. The magnitude $h_a$ corresponds to the height of the aircraft. The latter is retained within an internal memory 61 and delivered during the calculation step 60.

The magnitude $R_T$ corresponds to the Earth's radius, knowing that, in this example, it is the Earth's radioelectric radius that is considered.

The angle $\phi$ is the elevation of the radar beam.

The magnitude r is, as indicated above, the distance between the distance box in question and the radar antenna.

The magnitudes $(r,\phi)$ form the spherical reference mark associated with the radar. The point P is the centre of the distance box in question associated with the coordinates $(r,\phi)$.

The height $h_n$ is the height of the baric centre of the profile. The latter is associated with the elevation of the baric centre of the profile by the relation:

$$h_n = r\sin(\phi_n)$$

where $\phi_n$ is the elevation corresponding to the baric centre of the profile detected during the step 50.

The height $h_c$ is the height induced by the curvature of the Earth. It is defined, as shown in FIG. 8, as the distance between the horizontal touching the ground beneath the aircraft AV (and orthogonal to the radius of the Earth at this point) and the point of intersection P between the Earth and the vertical passing through a point of coordinates (r,φ) in the spherical reference mark associated with the radar.

Finally, $h_s$ is the height of the ground to be determined.

These various magnitudes are associated by the relation below:

$$h_s = (h_a + h_c - h_n)\cos\alpha \text{ where } \sin\alpha = \frac{r\cos\varphi}{R_T}.$$

The Pythagoras theorem allows us to write:

$$(R_T - h_c)^2 (r \cos \phi)^2 = R_T^2.$$

This therefore gives:

$$h_c = R_T - \sqrt{R_T^2 - (r\cos\phi)^2}.$$

After the calculation steps 60, the height of the ground $h_s$ is known for the distance box processed at a given relative bearing.

After the steps 60 and 40, the data obtained then sustain a space-based and time-based post-integration, in order to smooth the various values, step 70.

After the step 70 a map of the estimated ground altitude is generated 71, with the aid notably of the various values $h_{s,i}$ for each distance box/relative bearing pair $(r_i, \theta_i)$. This map can be used subsequently for other applications, for example the establishment of ground mapping.

Then the step 40 on the one hand and the steps 50, 60 are reiterated for another distance box/relative bearing pair $(r_i, \theta_i)$, until all of the pairs have been processed.

Once the totality of the data has been processed, the corresponding exclusion zone determined during the step 40 and the values below the elevation associated with the height called the ground height calculated during the step 60 are deleted for each vertical profile. For this step 80, it is possible to use a stored land numerical model 81.

A criterion other than the land numerical model may be taken in order to confirm the efficiency of the method: the power level of the echoes returned, the space correlation, etc.

As for the above step, the ground zones deleted 82 may be used subsequently for other applications, for example the establishment of ground mapping After the deletion, the resultant vertical profiles are then filtered in order to delete possible isolated spurious points, step 90.

The data corresponding to the filtered vertical profiles (without ground echoes) can then be displayed on a screen, step 100.

The method described above can be implemented by software within a processing device.

Figure 9:
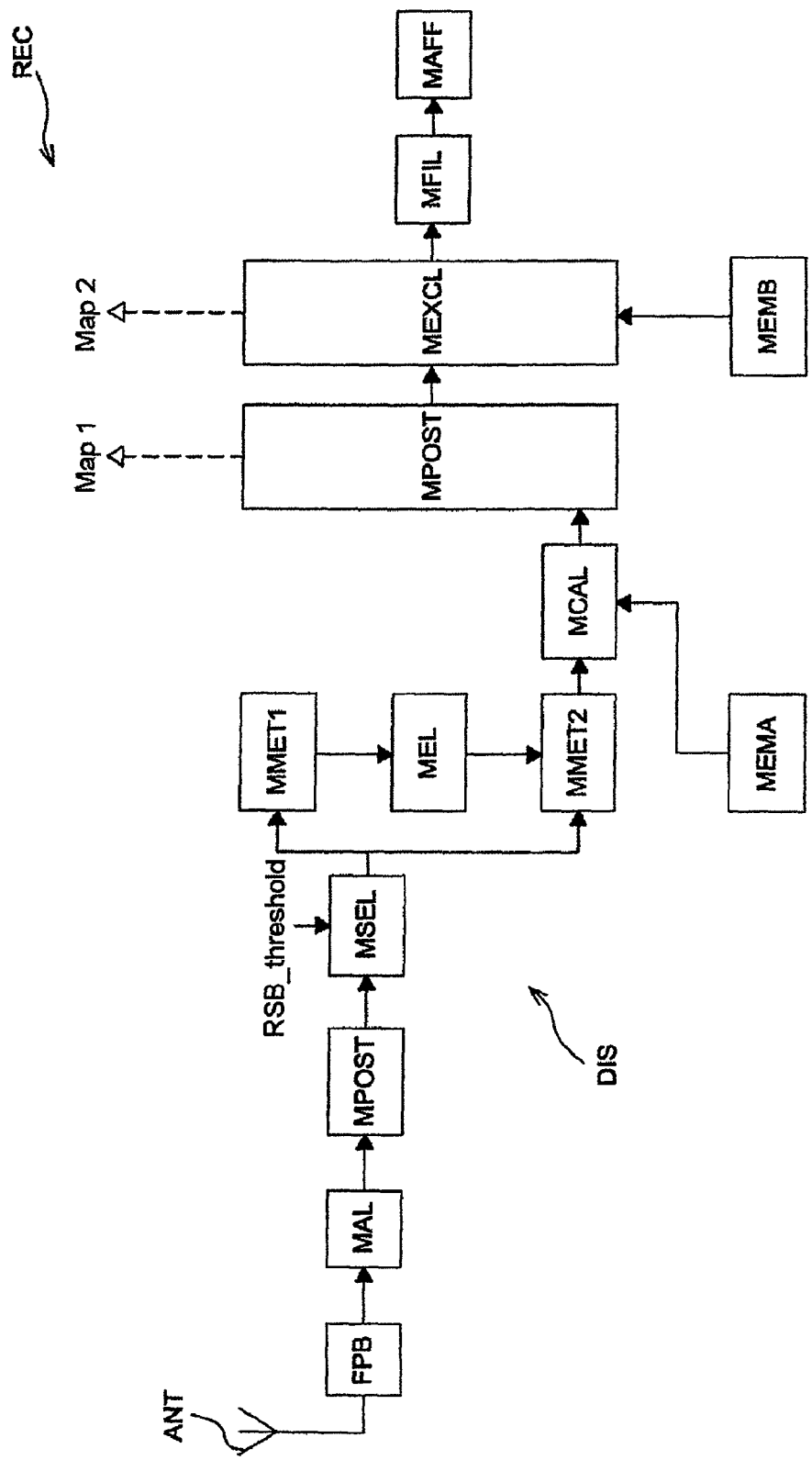
FIG. 9 represents an embodiment of a device according to the invention.

One embodiment is illustrated in FIG. 9. This figure represents, as an example, a reception means REC, in this instance of the radar type, incorporating such a processing device DIS according to the invention. The receiver REC is coupled to an antenna ANT.

The data received by the antenna NAT are then filtered by a bandwidth filter FPB in order to select a frequency band.

In this example, once filtered, the data are aligned by an alignment means MAL. A post-integration means MPOST then carries out a time-based and possibly space-based post-integration on the aligned data.

A selection means MSEL coupled at the output of the post-integration means MPOST is capable of selecting the data the signal-to-noise ratio of which, called the RSB, is greater than a chosen threshold RSB_threshold.

The selected data are then processed in parallel by two processing means referenced MMET1 and MMET2. Each means is respectively capable of applying the methods 1 and 2 described above.

In other words, the first processing means MMET1 is capable, for each measured vertical profile, of:

superposing the synthetic vertical profile on the measured vertical profile in question, for various pointing angle values, calculating the error that exists between the measured vertical profile and the synthetic vertical profile, for each pointing angle value in question.

The synthetic vertical profile, as described above, is generated by a generation means MEL coupled to the processing means MMET1 and MMET2.

Moreover, the second processing means MMET2, coupled to a calculation means MCAL, is capable of calculating the height of the ground for the measured vertical profile in question. The calculation means MCAL can be coupled to a memory MEMA capable of storing the height of the carrier which has the radar receiver REC on board.

A post-integration means MPOST carries out a post-integration of the processed data, in order to smooth the latter.

A ground mapping carto1 may be generated and delivered by the post-integration means MPOST to other processing modules (not shown here for the purposes of simplification).

The integrated data are then delivered to an exclusion means MEXCL capable of excluding, from the measured vertical profile:

values for which the error calculated by the first processing means MMET1 is minimal, called the values to be excluded, in order to generate a resultant vertical profile, with no ground echoes, and the values of the vertical profile that are below the pointing value corresponding to the ground height calculated by the second processing means MMET2 and the calculation means MCAL.

A map carto2 of the zones to be excluded can be generated and delivered by the exclusion means MEXCL to other processing modules (not shown here for the purposes of simplification).

The exclusion means MEXCL can be coupled to a memory MEMB capable of storing a land numerical model.

Each resultant vertical profile is then filtered by a filtering means MFIL, and then the filtered data are displayed on a display screen MAFF.

What is claimed is:

1. A computer processor implemented method for processing measured vertical profiles of the power of the echoes returned following a transmission of radar signals, each measured vertical profile being a function of the sweep angle of the radar beam and associated with a given pointing angle/distance box pair of the radar beam, the method comprising:

an obtaining of a stored synthetic vertical profile of the power of the echoes returned by the ground only, and for each measured vertical profile:

a superposition of the synthetic vertical profile on the measured vertical profile in question, for various values of the sweep angle, a calculation of the error that exists between the measured vertical profile and the synthetic vertical profile, for each sweep angle value in question, and an exclusion, from the measured vertical profile, of the values for which the calculated error is less than a given threshold, called values to be excluded, in order to generate a resultant vertical profile with no ground echoes, wherein the obtaining, superposition, calculation, and exclusion are performed by the computer processor, and the stored synthetic vertical profile corresponds to a shape of an antenna diagram of a radar antenna.

2. The method according to claim 1, in which the sweep angle is the angle of elevation and the pointing angle is the relative bearing.

3. The method according to claim 2, wherein said exclusion is made for all of the points of the measured vertical profile, if the number of points of the measured vertical profile is less than a given threshold.

4. The method according to claim 3, further comprising a calculation of the height of the ground for the measured vertical profile in question, which comprises:

another superposition of the synthetic vertical profile on the measured vertical profile in question, for all of the sweep angle values, a calculation of the error that exists between the measured vertical profile and the synthetic vertical profile, for all of the sweep angle values, a determination of the sweep angle value of the baric centre of the measured vertical profile corresponding to the minimal calculated error, a calculation of a so-called ground height for the measured vertical profile in question, with the aid of the said determined sweep angle value, the values of the vertical profile that are less than the pointing angle corresponding to the calculated ground height then being also excluded.

5. The method according to claim 4, in which the values to be excluded and the values of the ground height calculated for a given measured vertical profile are smoothed before the exclusion.

6. The method according to claim 5, wherein each resultant vertical profile is filtered so as to eliminate the isolated values.

7. The method according to claim 6, in which the exclusion is also a function of a numerical model of the ground.

8. The method according to claim 2, wherein said exclusion is made only for certain points of the measured vertical profile, corresponding to sweep angle values of less than a given threshold.

9. The method according to claim 8, further comprising a calculation of the height of the ground for the measured vertical profile in question, which comprises:

another superposition of the synthetic vertical profile on the measured vertical profile in question, for all of the sweep angle values, a calculation of the error that exists between the measured vertical profile and the synthetic vertical profile, for all of the sweep angle values, a determination of the sweep angle value of the baric centre of the measured vertical profile corresponding to the minimal calculated error, a calculation of a so-called ground height for the measured vertical profile in question, with the aid of the said determined sweep angle value, the values of the vertical profile that are less than the pointing value corresponding to the calculated ground height then being also excluded.

10. The method according to claim 9, wherein the values to be excluded and the values of the ground height calculated for a given measured vertical profile are smoothed before the exclusion.

11. The method according to claim 10, wherein each resultant vertical profile is filtered so as to eliminate the isolated values.

12. The method according to claim 11, wherein the exclusion is also a function of a numerical model of the ground.

13. A device for processing radar signals, coupled to a radar antenna capable of measuring the vertical profiles of the power of the echoes returned following a transmission of radar signals, each measured vertical profile being a function of the sweep angle of the radar beam and associated with a given pointing angle/distance box pair of the radar beam, the device comprising a means for obtaining a stored synthetic vertical profile of the power of the echoes returned by the ground only, and a first processing means capable, for each measured vertical profile, of:

superposing the synthetic vertical profile on the measured vertical profile in question, for various values of the sweep angle, calculating the error that exists between the measured vertical profile and the synthetic vertical profile, for each sweep angle value in question, and an exclusion means capable of excluding, from the measured profile, values for which the calculated error is less than a given threshold, called the values to be excluded, so as to generate a resultant vertical profile with no ground echoes, wherein the stored synthetic vertical profile corresponds to a shape of the radar antenna.

14. The processing device according to claim 13, further comprising a second processing means capable of calculating the height of the ground for the measured vertical profile in question, the said exclusion means also being capable of excluding the values of the vertical profile that are below the sweep value corresponding to the calculated ground height.

15. A radar receiver incorporating a device according to claim 14.

* * * * *